United States Patent
Warren (10) Patent No.: US 7,305,335 B2
(45) Date of Patent: Dec. 4, 2007

(54) PERMANENT THREE-POLE INDEPENDENT POLE OPERATION RECLOSER SIMULATOR FEATURE IN A SINGLE-POLE TRIP CAPABLE RECLOSER CONTROL

(75) Inventor: James T. (Ted) Warren, Dothan, AL (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 365 days.

(21) Appl. No.: 10/997,602

(22) Filed: Nov. 23, 2004

(65) Prior Publication Data

US 2006/0109600 A1 May 25, 2006

(51) Int. Cl.
*G06F 17/50* (2006.01)

(52) U.S. Cl. .............. 703/18; 703/4; 703/14; 703/15; 703/16; 326/16; 326/40

(58) Field of Classification Search ............ 703/18
See application file for complete search history.

(56) References Cited

U.S. PATENT DOCUMENTS

| | | | |
|---|---|---|---|
| 5,027,315 A * | 6/1991 | Agrawal et al. | 326/38 |
| 5,334,939 A | 8/1994 | Yarbrough | |
| 5,551,010 A * | 8/1996 | Iino et al. | 711/169 |
| 5,629,869 A * | 5/1997 | Johnson et al. | 702/34 |
| 5,936,974 A * | 8/1999 | Roberts et al. | 714/718 |
| 5,982,593 A * | 11/1999 | Kimblin et al. | 361/42 |
| 6,198,062 B1 * | 3/2001 | Mather et al. | 218/152 |
| 6,717,782 B2 | 4/2004 | DiSolvo et al. | |
| 2005/0097373 A1 * | 5/2005 | Stoupis et al. | 713/300 |

OTHER PUBLICATIONS

Section 6, Testing and Troubleshooting, SEL-487B Relay, Schweitzer Engineering Laboratories, Inc.
Ljubomir A. Kojovic, "Integration of Distributed Generation into Distribution Systems," The Line, Jun. 2002, www.cooperpower.com/Library/TheLine/pdf/june02/full.pdf.
"Reclosers: Kyle Type MET Electronic Recloser Control Tester," Electrical Apparatus 280-76, Cooper Power Systems, Aug. 1996, www.cooperpower.com/Library/pdf/28076/pdf.

(Continued)

*Primary Examiner*—Paul Rodriguez
*Assistant Examiner*—Michael Wilser
(74) *Attorney, Agent, or Firm*—Cook, Alex, McFarron, Manzo, Cummings & Mehler, Ltd.

(57) ABSTRACT

Disclosed is a permanent recloser simulator feature for use in a single-pole trip capable recloser control. The permanent recloser simulator feature includes a first logic circuit capable of enabling and disabling operation of the permanent recloser simulator feature in response to receipt of a binary logic signal, and a second logic circuit coupled to the first logic circuit where the second logic circuit is configured to provide an indication of a status of a first pole to a logic engine of the single-pole trip capable recloser control. The permanent recloser simulator feature may further include a third logic circuit associated with a second pole, and a fourth logic circuit associated with a third pole where both are coupled to the first logic circuit. Disabling means of the first logic circuit allow the first, second, third and fourth logic circuit to permanently reside in logic of the recloser control.

36 Claims, 3 Drawing Sheets

OTHER PUBLICATIONS

Schweitzer Engineering Laboratories, Inc., "SEL-651R Advanced Recloser Control".

G&W Electric Co., "Viper-ST Solid Dielectric, Trip Option, Electronic Vacuum Recloser," Aug. 2003, Catlog GW5-VST03.

Cooper Industries, Inc., "Protective Relays," Electrical Apparatus 165-420, Dec. 2002.

* cited by examiner

PERMANENT THREE-POLE INDEPENDENT POLE OPERATION RECLOSER SIMULATOR FEATURE IN A SINGLE-POLE TRIP CAPABLE RECLOSER CONTROL

CROSS-REFERENCE TO RELATED APPLICATIONS

None

BACKGROUND OF THE INVENTION

The present invention generally relates to simulating recloser pole positions in a recloser control, and more specifically, to a permanent three-pole independent pole operation recloser simulator feature in a single-pole trip capable recloser control.

Electric utility systems or power systems are designed to generate, transmit and distribute electrical energy to loads. In order to generate, transmit and distribute electrical energy, power systems generally include a variety of power system elements such as generators, transformers, power lines, buses and capacitor banks. As a result, power systems must also include protective devices and procedures to protect those elements from electrical short circuits. Such protective devices and procedures react to short circuits by isolating the short circuit from the remainder of the power system.

The short circuit faults may be caused by a number of conditions, for example, a conductor falling on the ground, a tree coming in contact with a conductor or two conductors touching each other. Further the conditions may be "self-healing" or they may be permanent. A self-healing or temporary short circuit is a short circuit that ceases to exist if power is removed from the short circuit for a period of time. Power system protection engineers take advantage of this fact by designing protective schemes that use automatic reclosers. Automatic reclosers re-energize a faulted element some time after it has been de-energized in response to a short circuit. If the short circuit is temporary (i.e., if it has self-healed during the time it was de-energized) then power is automatically restored sooner via operation of the automatic recloser. If the short circuit is not self-healing, then the automatic recloser will act again to isolate the short circuit from the remainder of the power system. One such automatic recloser is simply called a recloser.

Reclosers are fault interrupting devices that may combine fault detection, fault current interruption and subsequent line closing functions in one piece of equipment. Reclosers are typically utility pole-mounted on lower voltage (i.e., less than 40 kilovolt (KV) overhead distribution lines and feeders. Much like a circuit breaker, a current interrupting mechanism ("interrupter") of the recloser enables de-energizing and re-energizing of one phase of a three-phase ("3-phase") power signal. De-energizing is accomplished when the interrupter (e.g., a set of contacts) interrupts, or breaks, a high current flow during an occurrence of a short circuit. Re-energizing is accomplished when the interrupter makes, or re-establishes, the current flow.

Generally, an individual interrupter is part of a pole assembly, or pole, of the recloser. Each pole corresponds to one phase of the three-phase power system and may further include a chamber housing the interrupter and providing required insulating and arc interrupting medium (e.g., SF6 gas, oil), and an auxiliary contact mechanically linked to the interrupter. The auxiliary contact operates to provide an indication of the interrupter's open or closed status, referred to hereinafter as an open or closed pole status.

A single-phase trip capable recloser is sometimes referred to as an Independent Pole Operation (IPO) recloser. Older three-pole trip capable reclosers ("3-pole reclosers") were not capable of independent pole operation. As a result, the three interrupters of the older 3-pole reclosers were opened and closed together, even if only one phase of the three-phase power system was short circuited, such that all three phases were either energized or de-energized. Recent 3-pole recloser designs include three independent poles each having an interrupter operable to selectively and independently de-energize a corresponding phase of a three-phase power signal. Such reclosers are referred to herein after as 3-pole IPO reclosers. After opening a single pole in response to a single phase short circuit, the recloser re-energizes the corresponding phase (i.e., the recloser closes one pole) by either a self contained mechanical means of the recloser or by command from an external recloser controller, or recloser control.

A recloser control is typically mounted in a weather-proof enclosure at the bottom of a utility pole or steel structure to control and monitor operation of an associated recloser. Recloser controls are often capable of monitoring and controlling more than one pole of a recloser. For example, some recloser controls are capable of controlling a 3-pole IPO recloser, where the recloser control can independently open and close each pole's interrupter.

Prior to installation, recloser control testing requires connection to an actual recloser or to a bulky testing unit designed to simulate operation of a recloser. Recloser control testing with an actual recloser may not be practical due to recloser size or availability in a test lab setting. Further, recloser control testing with a testing unit requires that the testing unit be capable of exact simulation of the recloser. In the case of a 3-pole IPO recloser, recloser control testing requires that the testing unit be capable of receiving the trip (open) and close signals from the recloser control and be capable of emulating the three independently operated poles of a 3-pole IPO recloser. Moreover, for 3-pole IPO reclosers having magnetic actuators requiring a common trip and close circuit capable of dual polarity (i.e., direct current is applied in one direction to trip an interrupter, and in the opposite direction to close it), suitable test sets may not be available.

In the absence of suitable external testing or simulation equipment, one alternative is to utilize the recloser control to simulate the open and close pole states of the 3-pole IPO recloser. Prior art methods include building a temporary internal simulator using programmable logic. After testing is complete, the logic for temporary internal simulator is removed to prevent erroneous pole position indications during actual recloser operation in a power system. Unfortunately, use and removal of the temporary internal simulator logic may introduce erroneous logic settings into the recloser's existing correct logic, and may result in recloser control malfunction in the power system.

SUMMARY OF THE INVENTION

Disclosed is a permanent 3-pole independent pole operation (IPO) recloser simulator feature ("permanent recloser simulator feature") for use in a single-pole trip capable recloser control where the permanent recloser simulator feature enables single-pole trip capable recloser control testing without connecting an IPO recloser. The permanent recloser simulator feature includes a first logic circuit capable of enabling and disabling operation of the permanent recloser simulator feature in response to receipt of a binary logic signal, and a second logic circuit coupled to the first logic circuit where the second logic circuit is configured to provide an indication of a status of a first pole to a logic engine of the single-pole trip capable recloser control. The first and second logic circuits permanently reside in either fixed or programmable logic of the single-pole trip capable recloser control.

The first logic circuit of the permanent recloser simulator feature also includes a disable logic circuit capable of disabling operation of the permanent recloser simulator feature using any one of three means of the first logic circuit. The disable logic circuit causes operation of the permanent recloser simulator feature to be disabled in response to assertion of a Manual Disable. The disable logic circuit also causes operation of the permanent recloser simulator feature to be disabled in response to operation of a disable timer upon expiration of a pre-determined time period. Countdown of the pre-determined time period is initiated upon enabling operation of the permanent recloser simulator feature. The disable logic circuit further causes operation of the permanent recloser simulator feature to be disabled when an actual IPO recloser, having at least one closed pole, is connected to the single-pole trip capable recloser control.

For a single-pole trip capable recloser control configured to control a three-pole IPO recloser, the permanent recloser simulator feature further includes a third logic circuit coupled to the first logic circuit where the third logic circuit is configured to provide an indication of a status of a second pole to the logic engine, and a fourth logic circuit coupled to the first logic circuit where the fourth logic circuit is configured to provide an indication of a status of a third pole to the logic engine. The third and fourth logic circuits also permanently reside in either fixed or programmable logic of the single-pole trip capable recloser control.

DETAILED DESCRIPTION OF PREFERRED EMBODIMENTS

In general, the embodiments of this invention relate to a permanent simulator feature for simulating recloser operation in a recloser control. More specifically, the embodiments of this invention relate to a three-pole independent pole operation (3-pole IPO) recloser simulator feature that is configured to reside permanently in recloser control fixed or programmable logic. When enabled during recloser control testing, the permanent 3-pole IPO recloser simulator feature simulates operation of a 3-pole IPO recloser, including independent pole monitoring and control. In addition to providing 3-pole IPO recloser simulation, the 3-pole IPO recloser simulator feature includes three means for ensuring that the permanent 3-pole IPO recloser simulator feature remains disabled when the recloser control is connected to the 3-pole IPO recloser with one pole closed in a power system. As a result, the permanent 3-pole IPO recloser simulator feature provides 3-pole IPO recloser simulation in a recloser control without the problems associated with the use and removal of prior art temporary internal recloser simulators.

Although embodiments described herein are preferably implemented in a recloser control, it is contemplated that the embodiments may also be implemented in any suitable system control or protective devices.

Figure 1:
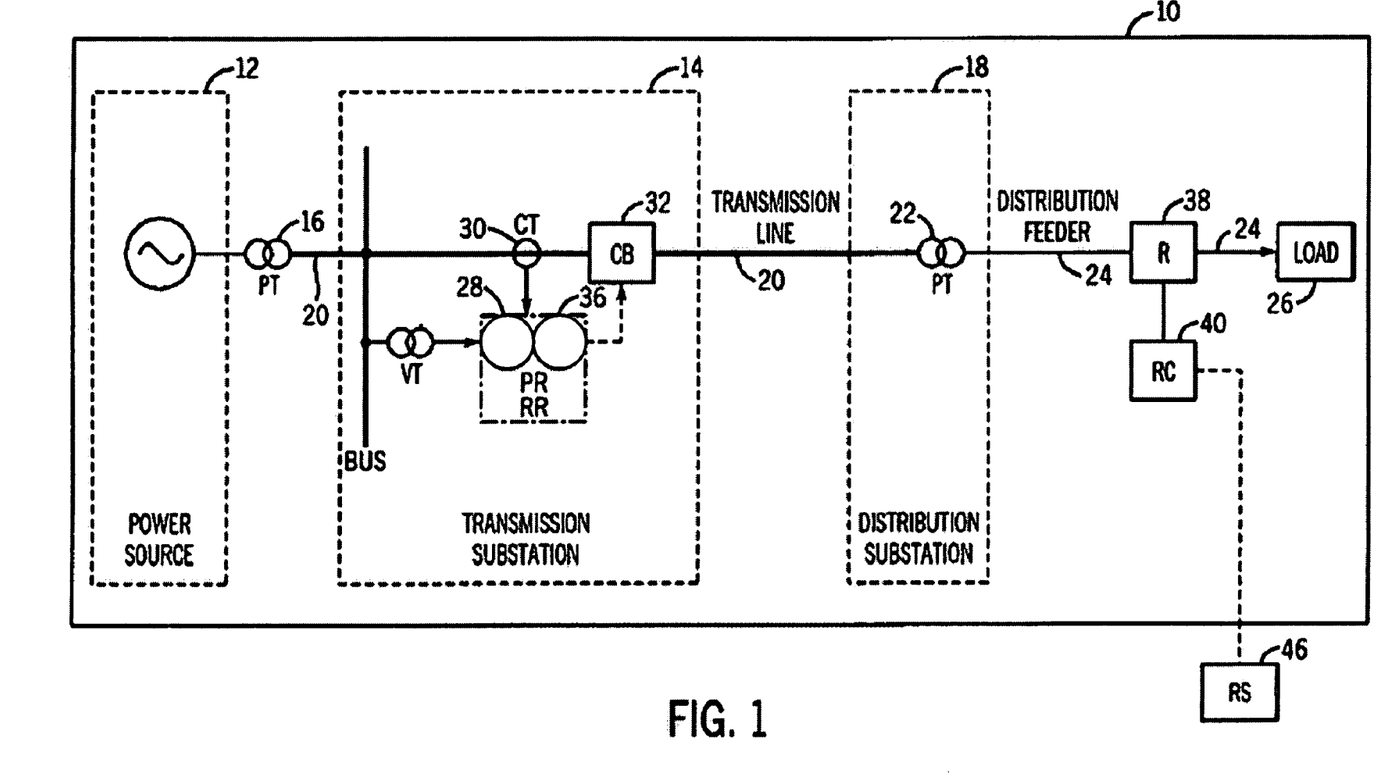
FIG. 1 is a functional block diagram of a portion of an electrical power system that may be utilized in a typical metropolitan area.

FIG. 1 is a functional block diagram of a portion of an electrical power system 10 that may be utilized in a typical metropolitan area. The electrical power system 10 includes a power source 12, for example, a steam powered spinning electrical generator, operatively coupled to a transmission substation 14 via a step-up power transformer 16 and a transmission line 20, and a distribution substation 18 operatively coupled to the transmission substation 14 via a step-down power transformer 22. Also included is a distribution feeder 24 from the distribution substation 18 to a load 26. Although only one power source 12, one transmission substation 14, one step-up power transformer 16, one transmission line 20, one step-down power transformer 22, one distribution substation 18 and one distribution feeder 24 are illustrated for ease of discussion, it should be understood that many more power sources, transmission substations, transmission lines and feeders, distribution substations, distribution lines, transformers, etc. in a variety of configurations are possible. In addition, although only one segment is used to represent the transmission line 20 and distribution feeder 24 shown in FIG. 1, it should be understood that both the transmission line 20 and the distribution feeder 24 are configured to support three-phase power.

During operation, the power source 12 generates three different phases of alternating current (AC) power simultaneously (the three-phase power) where the three phases are ideally offset by 120 electrical degrees from each other. The three-phase power is then stepped-up by the step-up power transformer 16 to an increased voltage level suitable for long distance transmission (e.g., 300 miles) via high voltage transmission lines. For example, the voltage of the generated three-phase power may be increased from 13 KV to 115 KV by the step-up power transformer 16 and transmitted from the transmission substation 14 via one or more transmission lines 20 to the distribution substation 18.

Upon reaching the distribution substation 18, the higher voltage three-phase power is stepped down via the step-down power transformer 22 to a decreased voltage level suitable for distribution via distribution lines and feeders 24. For example, the voltage of the three-phase power may be decreased from 115 KV to 25 KV by the step-down power transform 22 and distributed from the distribution substation 18 via the distribution feeder 24 to a load 26. Among other things, the distribution substation 18 energizes a distribution system that supplies power directly to customers. The distribution substation 18 also includes a bus that can split off the stepped-down power, or distribution power, into multiple directions. Additional power transformers may be included to further reduce the voltage of the distributed power to substantially lower voltages (e.g., 240 volts) suitable for receipt by the various loads and end users of the power system 10.

As previously mentioned, power systems such as the power system 10 include protective devices and procedures for protecting against short circuits. For example, as illustrated in FIG. 1, the substation 14 includes a protective relay 28 coupled to the transmission line 20 via a current transformer 30. The protective relay 28 operates to detect faults (e.g., a high current due to a phase-to-ground short circuit) and to issue a tripping signal to a power circuit breaker 32 when certain fault conditions occur. Upon receipt of the tripping signal, trip coils of the circuit breaker 32 are energized and the circuit breaker opens, causing a portion of the power system to be de-energized. A recloser relay 36 may then automatically reset the circuit breaker 32 (i.e., the circuit breaker closes) to test whether the fault is non-permanent.

Similarly, downstream from the power substation 14, the distribution substation 18 provides three-phase power to a distribution feeder 24. A utility pole-mounted 3-pole IPO recloser 38 is connected to one or more distribution feeder(s) 24. Operating much like three individual circuit breakers, interrupters of three individual poles of the 3-pole IPO recloser 38 selectively and individually interrupt current flow on a corresponding phase of the distribution feeder 24. This is commonly referred to as single-pole tripping. Single-pole tripping leaves the other two phases of the three-phase power system intact and minimizes shock to the power system 10. After fault clearing, the open set of interrupter contacts is re-closed. For ease of discussion, it may be assumed that each pole of the 3-pole IPO recloser 38 utilizes a set of interrupting contacts that selectively open to interrupt high current flow on a corresponding phase when a short circuit is detected on that phase. It should be understood however, that other types of interrupters may also be used in the 3-pole IPO recloser 38.

Connected to the 3-pole IPO recloser 38 is a utility pole-mounted recloser control 40 such as, for example, a SEL-651R recloser control manufactured by Schweitzer Engineering Laboratories, Inc. The recloser control 40 is configured to independently monitor, open and close each of the three poles of the 3-pole IPO recloser 38.

Prior to installation in the power system 10, the recloser control 40 is tested in a test lab setting to ensure proper operation. As previously mentioned, optimal recloser control testing requires connection to an actual recloser. In the absence of a suitable recloser, recloser control testing may be facilitated using a prior art external recloser simulator 46, or test set. Unfortunately, external recloser simulators such as the external recloser simulator 46 are bulky and not commercially available for dual polarity, magnetically actuated 3-pole IPO reclosers.

Another prior art alternative for recloser control testing includes the use of programmable logic to build a temporary internal simulator. After recloser control testing is complete, the temporary internal simulator logic is removed to prevent erroneous position indications during actual 3-pole IPO recloser operation in the power system 10. Unfortunately, use and removal of the temporary internal simulator logic may introduce erroneous logic into the recloser's existing correct logic which may result in recloser control malfunction in the power system 10.

Figure 2:
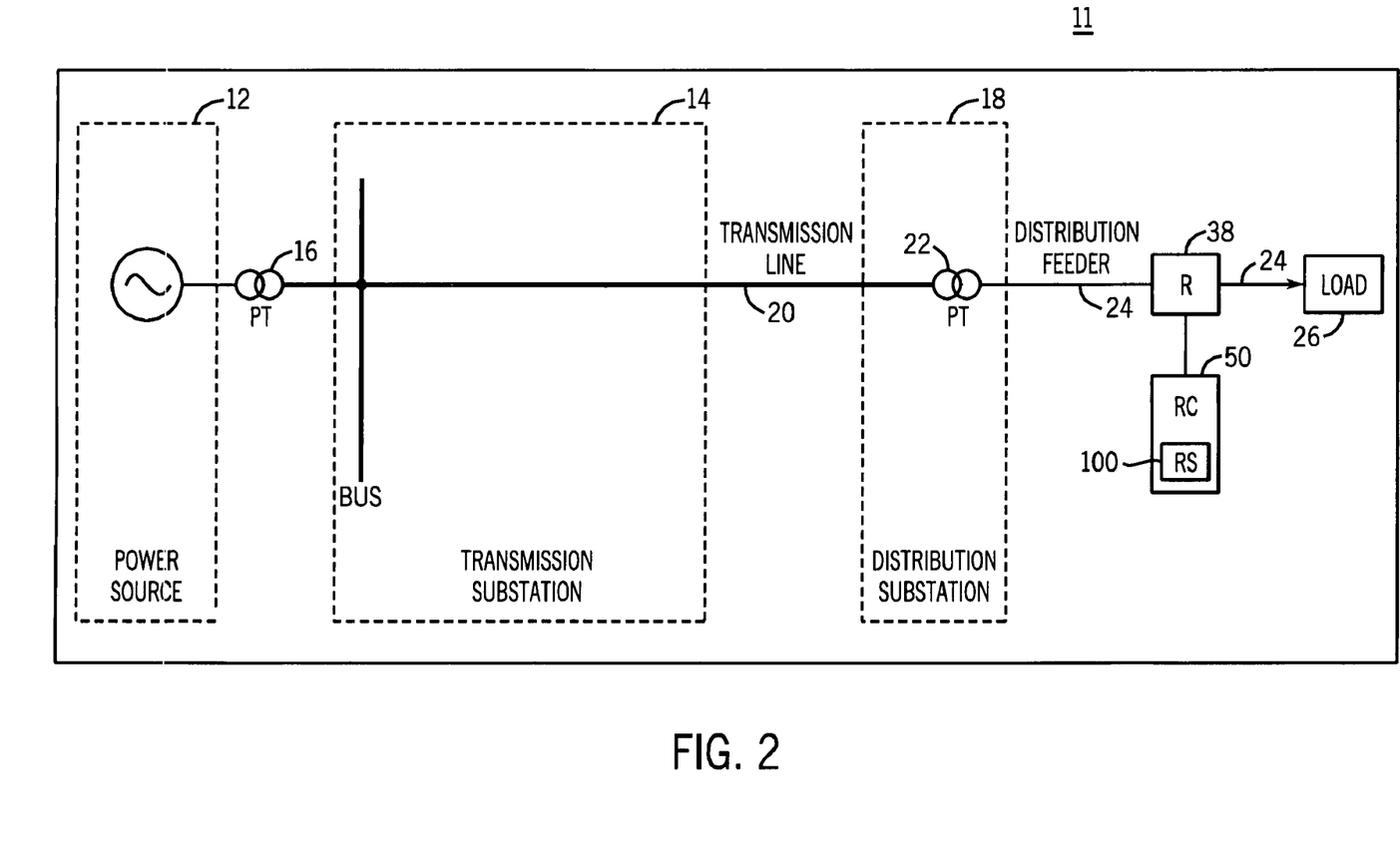
FIG. 2 is a functional block diagram of the portion of an exemplary electrical power system of FIG. 1 additionally including a single-phase trip capable recloser control having a permanent three-pole IPO recloser simulator feature according to an embodiment of the invention.

FIG. 2 is a functional block diagram of the portion of the electrical power system of FIG. 1 additionally including a single-pole trip capable recloser control 50 having a permanent 3-pole IPO recloser simulator feature 100 according to an embodiment of the invention. As discussed below, the single-phase trip capable recloser control 50 having the permanent 3-pole IPO recloser simulator feature 100 enables simulation of a 3-pole IPO recloser such as a Viper-ST Recloser available from G & W Electric Co. Unlike prior art temporary internal recloser simulators where corresponding simulator logic is temporarily installed in the recloser control and then removed after recloser control testing, the permanent 3-pole IPO recloser simulator feature 100 remains in the fixed or programmable logic of the recloser control 50. In addition, the permanent 3-pole IPO recloser simulator feature 100 includes three means for ensuring that the simulator feature 100 remains disabled when the recloser control 50 is installed with the 3-pole IPO recloser 38 in the power system 10. As a result, the permanent 3-pole IPO recloser simulator feature 100 overcomes use and removal problems associated with prior art temporary internal recloser simulators.

Permanent 3-Pole IPO Recloser Simulator Feature—Description

Figure 3:
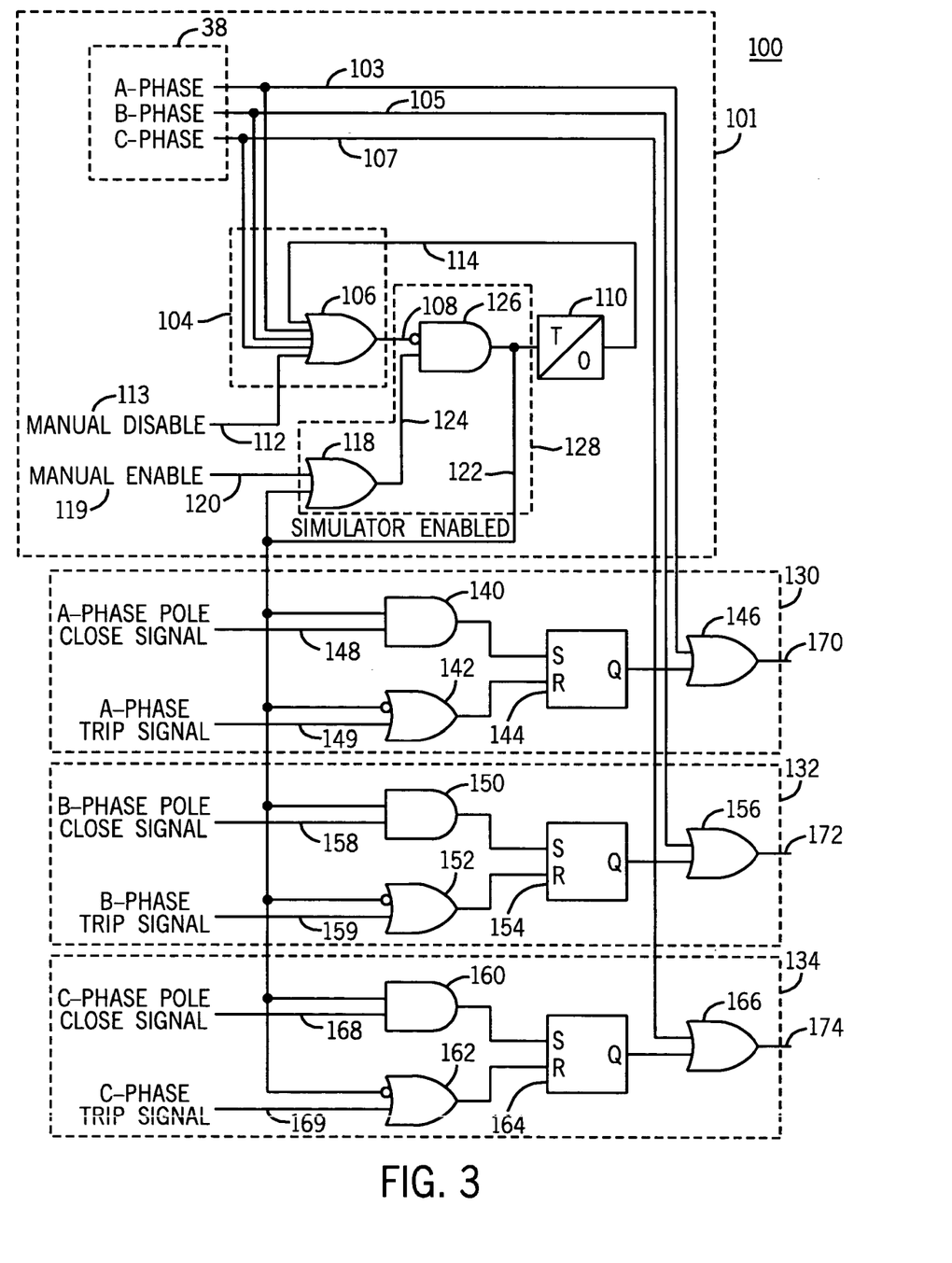
FIG. 3 is a logic circuit diagram of the permanent three-pole IPO recloser simulator feature of FIG. 2, according to an embodiment of the invention.

FIG. 3 is a logic circuit diagram of an exemplary permanent 3-pole IPO recloser simulator feature 100 according to an embodiment of the invention. Although preferably included in the fixed or programmable logic of the recloser control 50, it is contemplated that permanent 3-pole IPO recloser simulator feature 100 may be included in the fixed or programmable logic of one of any number of other power control devices. Further, although illustrated using the specific logic gate arrangements described below, it is contemplated that one of any number of other logic gate arrangements may be used to build the permanent 3-pole IPO recloser simulator feature 100. For ease of discussion, a positive logic convention will be used below where a logic 1 value, or high state, is more positive (e.g., 5 volts) than a logic 0 value, or low state (e.g., 0 volts). Further, the term "logic 1 signal" is used herein to refer to a binary signal having a logic 1 value, while the term "logic 0 signal" is used herein to refer to a binary signal having a logic 0 value.

Referring to FIG. 3, the permanent 3-pole IPO recloser simulator feature 100 (the "permanent recloser simulator feature 100") includes a first logic circuit 101 having simulator feature enable and disable logic, a second logic circuit 130 having A-phase pole simulation logic, a third logic circuit 132 having B-phase pole simulation logic and a fourth logic circuit 134 having C-phase pole simulation logic. A, B and C indicate individual monitored phases of a three-phase power signal. Each of the second, third and fourth logic circuits 130, 132, 134, are coupled to the first logic circuit 101. Although second, third and fourth logic circuits 130, 132, 134 are associated with the three poles of a 3-pole IPO recloser (or the three phases of the three-phase power system), it is contemplated that the permanent simulator recloser feature 100 may include more or less logic circuits if more or less recloser poles are monitored and controlled.

Inputs to the first logic circuit 101 include a manual enable input 120 configured to receive a logic 1 signal upon assertion of a Manual Enable 119, a manual disable input 112 configured to receive a logic 1 signal upon assertion of a Manual Disable 113, an A-phase pole status input 103 configured to receive a binary A-phase pole status signal from a connected recloser or external simulator, a B-phase pole status input 105 configured to receive a binary B-phase pole status signal from a connected recloser or external simulator and a C-phase pole status input 107 configured to receive a binary C-phase pole status signal from a connected recloser or external simulator. Accordingly, when a recloser such as the 3-pole IPO recloser 38 is connected to the recloser control 50, each of the three pole status inputs corresponds to a status (e.g., open or closed) of an individual interrupter of the 3-pole IPO recloser 38. In the illustrated example, a logic 1 signal on any of the three pole status inputs 103, 105, 107 indicates the presence of a connected 3-pole IPO recloser or external recloser simulator with an associated pole closed, while a logic 0 signal indicates the absence of a 3-pole IPO recloser, of absence of an externally simulated 3-pole IPO recloser, or an open pole.

The first logic circuit 101 also includes a disable logic circuit 104 having a first OR-gate 106 with one output and five inputs; a disable output 108, the manual disable input 112, the A-phase pole status input 103, the B-phase pole status input 105, C-phase pole status input 107 and a timer result input 114. A simulator auto-disable timer 110 (a "disable timer") of the first logic circuit 101 is configured to provide a binary logic signal to the timer result input 114.

A logic 1 signal applied to any of the five inputs of the first OR-gate 106 will cause the permanent recloser simulator feature 100 to be disabled as discussed below. A logic 1 signal is applied to the manual disable input 112 upon asserting the Manual Disable 113. A logic 1 signal is applied to the timer result input 114 upon expiration of a pre-determined time period of the disable timer 110. Countdown of the pre-determined time period is initiated upon enabling operation of the permanent recloser simulator feature 100. As mentioned above, a logic 1 signal is applied to a respective pole status input of the first OR-gate 106 when a single-pole of a 3-pole IPO recloser or external recloser simulator is closed.

The first logic circuit 101 further includes an enable logic circuit 128 configured to enable operation of the permanent recloser simulator feature 100. The enable logic circuit 128 includes a second OR-gate 118, and a first AND-gate 126 coupled to the outputs of the first and second OR-gates 106 and 118, respectively. The second OR-gate 118 includes an enable output 124, a first input, or a manual enable input 120, and a second input, or a simulator enabled input 122. The binary logic signal received via the simulator enabled input 122 is provided by the first AND-gate 126. As illustrated in FIG. 3, an inverse of the binary logic signal provided by the first OR-gate 106 to the disable output 108 is applied to a first input of the first AND-gate 126. The inverse, or NOT input, is illustrated by a circle positioned at the first input of the first AND-gate 126. The enable output 124 is connected to a second input of the first AND-gate 126. Accordingly, in addition to providing the binary logic signal to the simulator enabled input 122, the first AND-gate 126 provides the binary logic signal to initiate countdown of the disable timer 110 when the binary logic signal is a logic 1 signal.

As mentioned above, the permanent recloser simulator feature 100 includes the second logic circuit 130 simulating A-phase pole operation, the third logic circuit 132 simulating B-phase pole operation and the fourth logic circuit 134 simulating C-phase pole operation of the 3-pole IPO recloser 38. Each of the second, third and forth logic circuits 130, 132, 134 include four inputs and one simulated pole status output. The binary logic signal provided by each of pole status outputs is used by a "logic engine" of the recloser control 50 to perform recloser control timing functions and logic functions of the recloser control 50 thereby driving pole close and trip logic back into the permanent simulator feature 100. For example, a logic 1 signal provided on an A-phase pole status output 170 may be used in a 52a A-phase equation of the recloser control logic engine, a logic 1 signal provided on a B-phase pole status output 172 may be used in a 52a B-phase equation of the recloser control logic engine and a logic 1 signal provided on a C-phase pole status output 174 may be used in a 52a C-phase equation of the recloser control logic engine.

A first input, the simulator enabled input 122 enables receipt of a binary logic signal to enable or disable operation of the second, third and fourth logic circuits 130, 132, 134. For example, when a logic 0 signal is provided to the simulator enabled input 122, operation of the second, third and forth logic circuits 130, 132, 134 is disabled. A second input to each of the second, third and forth logic circuits 130, 132, 134 enables receipt of a respective binary Close signal to simulate corresponding pole (interrupter) closure, and a third input enables receipt of a respective binary Open signal to simulate corresponding pole opening. A fourth input enables a logic 1 signal received via a corresponding recloser interrupter status input 103, 105, 107 to be directly forwarded to the recloser control logic engine when the permanent simulator feature 100 is disabled.

As mentioned above, when the permanent simulator feature 100 is enabled, the second logic circuit 130 simulates operation of the A-phase pole of the recloser 38. The second logic circuit 130 includes a second AND-gate 140, a third OR-gate 142, a first Set-Reset (SR) latch 144 connected to the output of the second AND-gate 140 and the output of the third OR-gate 142. Also included is a fourth OR-gate 146 having a first input connected to the output of first SR latch 144 and having a second input connected to the corresponding A-phase pole status input 103. Operation of the fourth OR-gate 146 yields a binary logic signal on the A-phase pole status output 170. Inclusion of the fourth OR-gate 146 further ensures that the permanent recloser simulator feature 100 can permanently reside in the recloser control fixed or programmable logic as it enables a logic 1 signal on the A-phase pole status input 103 (resulting from a connected 3-pole IPO recloser) to go directly into the recloser control logic engine, thereby bypassing the permanent 3-pole IPO recloser simulator feature 100.

As illustrated in FIG. 3, a binary logic signal provided to the simulator enabled input 122 is applied to a first input of the second AND-gate 140 while an inverse of the binary logic signal provided to the simulator enabled input 122 is applied to a first input of the third OR-gate 142. A binary A-phase pole Close signal is applied a second input 148 of the second AND-gate 140, and a binary A-phase Trip signal is applied to a second input 149 of the third OR-gate 142.

Similarly, the third logic circuit 132 includes a third AND-gate 150, a fifth OR-gate 152, a second SR latch 154 connected to the output of the third AND-gate 150 and the output of the fifth OR-gate 152. Also included is a sixth OR-gate 156 having a first input connected to the output of the second SR latch 154 and having a second input connected to the corresponding B-phase pole status input 105. Operation of the sixth OR-gate 156 yields a binary logic signal on the B-phase status output 172. Inclusion of the sixth OR-gate 156 further ensures that the permanent recloser simulator feature 100 can permanently reside in the recloser control fixed or programmable logic.

A binary logic signal provided to the simulator enabled input 122 is applied to a first input of the third AND-gate 150 while an inverse of the binary logic signal provided to the simulator enabled input 122 is applied to a first input of the fifth OR-gate 152. A binary B-phase pole Close signal is applied a second input 158 of the third AND-gate 150, and a binary B-phase Trip signal is applied to a second input 159 of the fifth OR-gate 152.

The fourth logic circuit 134 includes a fourth AND-gate 160, a seventh OR-gate 162, a third SR latch 164 connected to the output of the fourth AND-gate 160, and the output of the seventh OR-gate 162. Also included is an eighth OR-gate 166 having a first input connected to the output of third SR latch 164 and having a second input connected to the corresponding C-phase pole status input 107. Operation of the eighth OR-gate 166 yields a binary logic signal on the C-phase pole status output 174. Inclusion of the eight OR-gate 166 further ensures that the permanent recloser simulator feature 100 can permanently reside in the recloser control fixed or programmable logic.

A binary logic signal provided to the simulator enabled input 122 is applied to a first input of the fourth AND-gate 160 while an inverse of the binary logic signal provided to the simulator enabled input 122 is applied to a first input of the seventh OR-gate 162. A binary C-phase pole Close signal is applied a second input 168 of the fourth AND-gate 160, and a binary C-phase Trip signal is applied to a second input 169 of the seventh OR-gate 162.

Permanent 3-Pole IPO Recloser Simulator Feature—Operation

Ensuring that the permanent simulator feature 100 is disabled is desirable when the recloser control is connected to an actual 3-pole IPO recloser. Accordingly, the permanent recloser simulator feature 100 includes three means for ensuring that the permanent simulator feature 100 remains disabled when the recloser control 50 is connected to the 3-pole IPO recloser 38 in the power system 10. Exercising any one of the three means will disable the permanent recloser simulator feature 100.

Using the first means, the permanent recloser simulator feature 100 is disabled when any one of the three pole status inputs 103, 105, 107, presents a logic 1 signal to the first OR-gate 106. A logic 1 signal indicates that an actual 3-pole IPO recloser is connected to the recloser control 50 and that an associated recloser pole is in the closed position. Referring again to FIG. 3, as a result of operation of the first OR-gate 106, a logic 1 signal appearing on any one of the three pole status inputs 103, 105, 107 yields a logic 1 signal on the disable output 108. As a result of operation of the first AND-gate 126, when the logic 1 signal is applied to a first input of the first AND-gate 126, a logic 0 signal is applied to the simulator enabled input 122. Accordingly, the permanent simulator feature 100 is disabled and the binary logic signal on each of the three pole status inputs 103, 105, 107 is applied directly to their pole status outputs 170, 172 and 174, respectively, thereby bypassing the permanent recloser simulator feature 100. Thus, if the 3-pole IPO recloser 38 is connected to the recloser control 50 and any of the three poles of the 3-pole IPO recloser 38 are closed, the permanent recloser simulator feature 100 is disabled, or deactivated.

Using the second means, the permanent recloser simulator feature 100 is disabled when the Manual Disable 113 is asserted. Asserting the Manual Disable 113 causes a logic 1 signal to be applied to the manual disable input 112 of the first OR-gate 106, yielding a logic 1 signal on the disable output 108 and logic 0 signal on the simulator enabled input 122. As a result, the permanent simulator feature 100 is disabled.

The Manual Disable 113 may be asserted in one of any number of ways, depending on the design of the recloser control 50. For example, an operator may actuate a dedicated programmable Manual Disable pushbutton of a front panel human-machine interface (HMI) of the recloser control 50. In another example, an operator may assert the Manual Disable 113 via using a liquid crystal display (LCD), navigation buttons and an Enter button on the front panel HMI. Using the navigation button, the operator may scroll through a menu displayed on the LCD display, select an appropriate menu entry and actuate the Enter button to assert the Manual Disable 113.

Using the third means, the permanent recloser simulator feature 100 is disabled when a pre-determined time period of the disable timer 110 expires. Count-down of the pre-determined time period begins when a logic 1 signal is provided to the simulator enabled input 122, indicating that the permanent recloser simulator feature 100 is enabled and 3-pole IPO recloser simulation is underway. Once initiated, count-down of the simulator time period continues until the pre-determined time period expires.

The pre-determined time period may be varied to allow sufficient simulation test time for the recloser control 50 using the permanent simulator recloser feature 100. For example, a maximum time period may be selected to be three hours. After three hours, the disable timer 110 causes a logic 1 signal to be applied to the timer result input 114. Application of the logic 1 signal to the timer result input 114 yields a logic 1 signal on the disable output 108 and a logic 0 signal on the simulator enabled input 122, thereby causing the permanent simulator feature 100 to be disabled.

The permanent recloser simulator feature 100 is enabled when the Manual Enable 119 is asserted. Like the Manual Disable 113, the Manual Enable 119 may be asserted in one of any number of ways, depending on the design of the recloser control 50. Asserting the Manual Enable 119 causes a logic 1 signal to be applied to the manual enable input 120 of the second OR-gate 118, yielding a logic 1 signal on the enable output 124. If a logic 0 signal is provided to the disable output 108 (as is the case when the permanent recloser simulator feature 100 is not disabled), a logic 1 signal is provided to the simulator enabled input 122. As a result, the permanent recloser simulator feature 100 is enabled.

The permanent recloser simulator feature 100 remains enabled until (1) it is manually disabled via the Manual Disable 113, (2) power to the recloser control 50 is cycled, (3) one or more settings in the recloser control 50 are changed, (4) the maximum simulator time period is reached, or (5) an actual recloser is connected to the recloser control 50 and one of the interrupters is closed (i.e., one of the recloser interrupter status inputs goes high).

Additional logic gates may be added to the logic circuit of the permanent recloser simulator feature 100 to facilitate disabling via power cycling and/or setting changes described above. For example, additional individual inputs to the first OR-gate 106 where each input corresponds to a binary power cycling signal and/or a binary setting change signal.

When the permanent recloser simulator feature 100 is enabled, open and close states for the A-phase pole are simulated via the second logic circuit 130, open and close states for the B-phase pole are simulated via the third logic circuit 132, and open and close states for the C-phase pole are simulated via the fourth logic circuit 134. Set-Reset latches ensure that each of the second, third and fourth logic circuits 130, 132, 134, yield an output having a logic 1 signal when a simulated Close pole state is desired and yield an output having a logic 0 signal when a simulated Open pole state is desired. For ease of discussion only operation of the second logic circuit 130 will be described in detail, it being under stood that the operation of the third logic circuit 132 and the fourth logic circuit 134 are substantially identical.

As mentioned above, the second logic circuit 130 includes the second AND-gate 140, the third OR-gate 142, the first SR latch 144 having a first input (S-input) connected to the output of the second AND-gate 140 and having a second input (R-input) connected to the third OR-gate 142, and the fourth OR-gate 146 having the first input connected to the output of first SR latch 144 and having a second input connected to the corresponding A-phase pole status input 103. The fourth OR-gate 146 provides the A-phase pole status output 170 to the recloser control logic engine.

When logic 1 signal is applied via the simulator enabled input 122 to the first input of the second AND-gate 140, a logic 0 signal is applied to the first input of the third OR-gate 142. The binary A-phase pole Close signal is provided to the second input 148 of the second AND-gate 140 and the binary A-phase pole Trip signal is provided to the second input 149 of the third OR-gate 142.

Referring to the second AND-gate 140 and the first SR latch 144, when the permanent recloser simulator feature 100 is enabled, a logic 1 signal is provided to the first input of the second AND-gate 140 via the simulator enabled input 122. When the A-phase Close signal is asserted, simulating that the recloser control 50 is issuing a "close" command to the A-phase pole, a resulting logic 1 signal from the second AND-gate 140 is applied to the S-input of the first SR latch 144. In response, a logic 1 signal is provided to the output of the SR latch 144 and the A-phase pole status output 170. The logic 1 signal provided to the A-phase pole status output 170 represents a closed status of the A-phase pole and is used by the logic engine of the recloser control 50 to perform various timing and logic functions such as enabling and disabling certain protective elements, timing how long the A-phase pole has been closed for resetting purposes, etc.

Assertion of the A-phase Close signal may be accomplished in one of any number of ways, depending on the design of the recloser control 50. For example, an operator may manually actuate a dedicated programmable pushbutton of the front panel HMI of the recloser control 50, or the operator may assert the A-phase Close signal via an LCD display displaying a menu, navigation buttons and an Enter button on the front panel HMI. In some cases, the operator may remotely assert the A-phase Close signal via a remotely issued closing command. Assertion of the A-phase Close signal may also be accomplished in response to operation of auto-recloser logic of the recloser control logic engine.

Referring to the third OR-gate 142 and the first SR latch 144, when the permanent simulator feature 100 is enabled, inversion of a logic 1 signal provided via the simulator enabled input 122 to the first input of the third OR-gate 142 prevents operation of the third OR-gate 142 until the A-phase Trip signal is asserted. When the A-phase Trip signal is asserted, simulating that the recloser control 50 is issuing an "open" command to the A-phase pole, a resulting logic 1 signal is provided to the R-input of the first SR latch 144 via the output of the third OR-gate 142. In response, a logic 0 signal is provided to the output of the SR latch 144 and on the A-phase pole status output 170. The logic 0 signal provided to the A-phase pole status output 170 represents an open status of the A-phase pole and is used by the logic engine of the recloser control 50 to perform various timing and logic functions. If neither input to the SR latch 122 is a logic 1 signal, the A-phase pole status output 170 remains in its previous state while the permanent recloser simulator feature 100 is enabled.

As may be apparent from the above discussion, the permanent 3-pole IPO recloser simulator feature 100 is configured to reside permanently in recloser control fixed or programmable logic. When enabled during recloser control testing, the permanent 3-pole IPO recloser simulator feature 100 simulates operation of a 3-pole IPO recloser, including independent pole monitoring and control. In addition to providing 3-pole IPO recloser simulation, the 3-pole IPO recloser simulator feature 100 includes three means for ensuring that the permanent 3-pole IPO recloser simulator feature remains disabled when the recloser control is connected to the 3-pole IPO recloser in a power system. As a result, the permanent 3-pole IPO recloser simulator feature 100 provides 3-pole IPO recloser simulation in a recloser control without the problems associated with the use and removal of prior art temporary internal recloser simulators.

The present invention has been described in part by reference to block diagrams, and elements of systems and steps of methods. As is well known, suitable program instructions or coding provided in software are used to turn general purpose computers and/or processors into programmed computers and/or processors to form systems capable of carrying out a specific application, such as the teachings of the present invention.

As will also be appreciated by those skilled in the art, the software or other coding employed to implement the present invention may be provided in any suitable form of computer program code embodied in tangible media, such as but not limited to floppy diskettes, Compact Disc read only memories (CD-ROMs), hard drives, static or flash memory, or any other computer readable storage medium. When such computer program code or other code, containing the needed instructions, is loaded into and is ready for execution by suitable computers/processors/microcontrollers, such programmed computers/processors/microcontrollers become an apparatus for practicing the invention. Thus, it should be appreciated that another embodiment of the present invention is the computer program code needed for carrying out the processes of the present invention when it is embodied in a tangible medium.

The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

It is claimed:

1. A permanent recloser simulator feature for use in a single-pole trip capable recloser control, the permanent recloser simulator feature enabling single-pole trip capable recloser control testing, the feature comprising:
   a first logic circuit capable of enabling operation and disabling operation of the permanent recloser simulator feature in response to receipt of a binary logic signal; and
   a second logic circuit coupled to the first logic circuit, the second logic circuit configured to provide an indication of a status of a first pole to a logic engine of the single-pole trip capable recloser control,
      wherein the first and second logic circuits permanently reside in logic of the single-pole trip capable recloser control.

2. The permanent recloser simulator feature of claim 1, wherein the logic of the single-pole capable recloser comprises programmable logic.

3. The permanent recloser simulator feature of claim 1, wherein the logic of the single-pole capable recloser comprises fixed logic.

4. The permanent recloser simulator feature of claim 1, wherein the first logic circuit further comprises a disable logic circuit capable of disabling operation of the permanent recloser simulator feature in response to receipt of the binary logic signal.

5. The permanent recloser simulator feature of claim 4, wherein the binary logic signal is generated in response to assertion of a Manual Disable.

6. The permanent recloser simulator feature of claim 4, wherein the binary logic signal is generated by a disable timer of the first logic circuit upon expiration of a pre-determined time period, count-down of the pre-determined time period initiated upon enabling operation of the permanent recloser simulator feature.

7. The permanent recloser simulator feature of claim 4, wherein the binary logic signal is generated when an independent pole operation recloser having at least one closed pole is connected to the single-pole trip capable recloser control.

8. The permanent recloser simulator feature of claim 4, wherein the binary logic signal is generated when an externally simulated independent pole operation recloser having at least one closed pole is connected to the single-pole trip capable recloser control.

9. The permanent recloser simulator feature of claim 4, wherein the disable logic circuit comprises a first OR-gate having a plurality of inputs corresponding to respective disabling means of the permanent recloser simulator feature, and wherein the binary logic signal comprises a logic 1 signal.

10. The permanent recloser simulator feature of claim 1, wherein the first logic circuit further comprises an enable logic circuit capable of enabling operation of the permanent recloser simulator feature in response to receipt of the binary logic signal.

11. The permanent recloser simulator feature of claim 10, wherein the binary logic signal is generated in response to assertion of a Manual Enable.

12. The permanent recloser simulator feature of claim 11, wherein the enable logic circuit comprises a first AND-gate and a second OR-gate, a first input to the second OR-gate coupled to the Manual Enable, a second input to the second OR-gate connected to an output of the first AND-gate, a first input to the first AND-gate connected to an output of the second OR-gate, the output of the first AND-gate coupled to the second logic circuit.

13. The permanent recloser simulator feature of claim 11, wherein the second logic circuit is operable in response to receipt of a binary Simulator Enabled signal, the binary Simulator Enabled signal generated by the first logic circuit in response to assertion of the Manual Enable if operation of the permanent recloser simulator feature is not disabled.

14. The permanent recloser simulator feature of claim 13, wherein the indication of the status of the first pole is the binary logic signal having a first logic value for a closed first pole and a second logic value for an open first pole.

15. The permanent recloser simulator feature of claim 14, wherein the binary logic signal having the first logic value is generated by the second logic circuit in response to assertion of a Close signal when the permanent recloser simulator feature is enabled.

16. The permanent recloser simulator feature of claim 15, wherein the binary logic signal having the second logic value is generated by the second logic circuit in response assertion of a Trip signal when the permanent recloser simulator feature is enabled.

17. The permanent recloser simulator feature of claim 16, wherein the second logic circuit comprise:
 a second AND-gate having a first input configured to receive the binary Simulator Enabled signal and having a second input to receive the logic 1 signal upon assertion of the Close signal;
 a third OR-gate having a first input configured to receive an inverse of the binary Simulator Enabled signal and having a second input configured to receive the logic 1 signal upon assertion of the Trip signal;
 a set-reset latch having a first input coupled to an output of the second AND-gate and having a second input coupled to an output of the third OR-gate; and
 a fourth OR-gate having a first input and a second input, the first input configured to receive the logic 1 signal when an independent pole operation recloser having at least one closed pole is connected to the single-pole trip capable recloser control, the second input coupled to an output of the set-reset latch, the output of the fourth OR-gate configured to provide the indication of the status of the first pole to the logic engine,
 wherein the binary Simulator Enabled signal comprises the logic 1 signal.

18. The permanent recloser simulator feature of claim 1, wherein the permanent recloser simulator feature is further capable of enabling three single-pole trip capable recloser control testing, and wherein the indication of the status of the first pole comprises an A-phase pole status output corresponding to an A-phase pole of a three-pole independent pole operation recloser.

19. The permanent recloser simulator feature of claim 18, further comprising:
 a third logic circuit coupled to the first logic circuit, the third logic circuit configured to provide an indication of a status of a second pole to the logic engine, the indication of the status of the second pole comprising a B-phase pole status output corresponding to a B-phase pole of the three-pole independent pole operation recloser; and
 a fourth logic circuit coupled to the first logic circuit, the fourth logic circuit configured to provide an indication of a status of a third pole to the logic engine, the indication of the status of the third pole comprising a C-phase pole status output corresponding to a C-phase pole of the three-pole independent pole operation recloser,
 wherein the third and fourth logic circuit permanently reside in logic of the single-pole trip capable recloser control.

20. A permanent recloser simulator feature for use in a single-pole trip capable recloser control, the permanent recloser simulator feature enabling single-pole trip capable recloser control testing, the feature comprising:
 a first logic circuit capable of enabling operation and disabling operation of the permanent recloser simulator feature in response to receipt of a binary logic signal;
 a second logic circuit coupled to the first logic circuit, the second logic circuit configured to provide an indication of a status of a first pole to a logic engine of the single-pole trip capable recloser control;
 a third logic circuit coupled to the first logic circuit, the third logic circuit configured to provide an indication of a status of a second pole to the logic engine; and
 a fourth logic circuit coupled to the first logic circuit, the fourth logic circuit configured to provide an indication of a status of a third pole to the logic engine,
 wherein the first, second, third and fourth logic circuits permanently reside in logic of the single-pole trip capable recloser control.

21. The permanent recloser simulator feature of claim 20, wherein the logic of the single-pole capable recloser comprises programmable logic.

22. The permanent recloser simulator feature of claim 20, wherein the logic of the single-pole capable recloser comprises fixed logic.

23. The permanent recloser simulator feature of claim 20, wherein the first logic circuit further comprises a disable logic circuit capable of disabling operation of the permanent recloser simulator feature in response to receipt of the binary logic signal.

24. The permanent recloser simulator feature of claim 23, wherein the binary logic signal is generated in response to assertion of a Manual Disable.

25. The permanent recloser simulator feature of claim 23, wherein the binary logic signal is generated by a disable timer of the first logic circuit upon expiration of a pre-determined time period, count-down of the pre-determined time period initiated upon enabling operation of the permanent recloser simulator feature.

26. The permanent recloser simulator feature of claim 23, wherein the binary logic signal is generated when an independent pole operation recloser having at least one closed pole is connected to the single-pole trip capable recloser control.

27. The permanent recloser simulator feature of claim 23, wherein the binary logic signal is generated when an externally simulated independent pole operation recloser having at least one closed pole is connected to the single-pole trip capable recloser control.

28. The permanent recloser simulator feature of claim 23, wherein the disable logic circuit comprises a first OR-gate having a plurality of inputs corresponding to respective disabling means of the permanent recloser simulator feature, and wherein the binary logic signal comprises a logic 1 signal.

29. The permanent recloser simulator feature of claim 20, wherein the first logic circuit further comprises an enable logic circuit capable of enabling operation of the permanent recloser simulator feature in response to receipt of the binary logic signal.

30. The permanent recloser simulator feature of claim 29, wherein the binary logic signal is generated in response to assertion of a Manual Enable.

31. The permanent recloser simulator feature of claim 30, wherein the enable logic circuit comprises a first AND-gate and a second OR-gate, a first input to the second OR-gate coupled to the Manual Enable, a second input to the second OR-gate connected to an output of the first AND-gate, a first input to the first AND-gate connected to an output of the second OR-gate, the output of the first AND-gate coupled to the second logic circuit.

32. The permanent recloser simulator feature of claim 30, wherein each of the second, third and fourth logic circuits are operable in response to receipt of a binary Simulator Enabled signal, the binary Simulator Enabled signal generated by the first logic circuit in response to assertion of the Manual Enable if operation of the permanent recloser simulator feature is not disabled.

33. The permanent recloser simulator feature of claim 32, wherein each of the indications of the status of the first pole and the second pole and the third pole comprise the binary logic signal having a first logic value for a closed respective pole and a second logic value for an open respective pole.

34. The permanent recloser simulator feature of claim 33, wherein the binary logic signal having the first logic value is generated by each of the second, third and fourth logic circuits in response to assertion of a Close signal when the permanent recloser simulator feature is enabled.

35. The permanent recloser simulator feature of claim 34, wherein the binary logic signal having the second logic value is generated by each of the second, third and fourth logic circuits in response assertion of a Trip signal when the permanent recloser simulator feature is enabled.

36. The permanent recloser simulator feature of claim 35, wherein each of the second, third and fourth logic circuits comprises:
- a second AND-gate having a first input configured to receive the binary Simulator Enabled signal and having a second input to receive the logic 1 signal upon assertion of the Close signal;
- a third OR-gate having a first input configured to receive an inverse of the binary Simulator Enabled signal and having a second input configured to receive the logic 1 signal upon assertion of the Trip signal;
- a set-reset latch having a first input coupled to an output of the second AND-gate and having a second input coupled to an output of the third OR-gate; and
- a fourth OR-gate having a first input and a second input, the first input configured to receive the logic 1 signal when an independent pole operation recloser having at least one closed pole is connected to the single-pole trip capable recloser control, the second input coupled to an output of the set-reset latch, the output of the fourth OR-gate configured to provide the indication of the status of the first pole to the logic engine,
  wherein the binary Simulator Enabled signal comprises the logic 1 signal.

* * * * *